(12) United States Patent
Das et al.

(10) Patent No.: US 12,348,805 B2
(45) Date of Patent: *Jul. 1, 2025

(54) DEMOGRAPHIC CLASSIFICATION OF MEDIA ACCOUNTS BASED ON MEDIA CONTENT DATA

(71) Applicant: Roku, Inc., San Jose, CA (US)

(72) Inventors: Soudipta Das, San Jose, CA (US); Venkata Yerubandi, San Jose, CA (US); Ricardo Vasquez-Sierra, San Jose, CA (US); Bhaskar Parvathaneni, Cupertino, CA (US); Mithal Kothari, San Jose, CA (US); Gregory Enriquez, San Jose, CA (US); Raghavendra Sunku, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,042

(22) Filed: Jul. 1, 2024

(65) Prior Publication Data

US 2024/0357190 A1 Oct. 24, 2024

Related U.S. Application Data

(63) Continuation of application No. 18/229,046, filed on Aug. 1, 2023, now Pat. No. 12,069,325, which is a
(Continued)

(51) Int. Cl.
*H04N 21/258* (2011.01)
*H04N 21/24* (2011.01)

(52) U.S. Cl.
CPC ... *H04N 21/25883* (2013.01); *H04N 21/2407* (2013.01); *H04N 21/25891* (2013.01)

(58) Field of Classification Search
CPC ......... H04N 21/25883; H04N 21/2407; H04N 21/25891
See application file for complete search history.

(56) References Cited

U.S. PATENT DOCUMENTS 6,684,194 B1 * 1/2004 Eldering .............. H04N 21/252
348/E7.071
7,150,030 B1 12/2006 Eldering et al.
(Continued)

OTHER PUBLICATIONS

Extended European Search Report directed to related European Application No. 22195916.6, mailed Jan. 17, 2023; 7 pages.

*Primary Examiner* — Fernando Alcon
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for classifying media accounts of a media system into different demographic buckets based on media content data associated with the media accounts, where media content associated with a media account can be accessed by a plurality of members in a household of the media account. A demographic classifier can receive a plurality of media accounts, a plurality of sets of probability scores corresponding to the plurality of media accounts, and a plurality of demographic buckets. The demographic classifier can further estimate, based on public available information, an approximate number of media accounts of the plurality of media accounts belonging to a specific demographic bucket. The demographic classifier can further select the approximate number of media accounts to be included in a set of media accounts assigned to the specific demographic bucket.

20 Claims, 5 Drawing Sheets

Related U.S. Application Data continuation of application No. 17/476,026, filed on Sep. 15, 2021, now Pat. No. 11,765,416.

(56) References Cited

U.S. PATENT DOCUMENTS

| | | | |
|---|---|---|---|
| 7,240,355 B1 | 7/2007 | Eldering et al. | |
| 7,949,565 B1 | 5/2011 | Eldering et al. | |
| 9,712,869 B1 | 7/2017 | Arini et al. | |
| 11,516,540 B2 | 11/2022 | Mowrer et al. | |
| 11,671,640 B1 | 6/2023 | Modi et al. | |
| 11,765,416 B2 | 9/2023 | Das et al. | |
| 11,838,582 B1* | 12/2023 | Sharifi | G06F 3/167 |
| 2002/0123928 A1 | 9/2002 | Eldering et al. | |
| 2002/0129368 A1 | 9/2002 | Schlack et al. | |
| 2002/0178447 A1 | 11/2002 | Plotnick et al. | |
| 2003/0093792 A1 | 5/2003 | Labeeb et al. | |
| 2003/0097657 A1* | 5/2003 | Zhou | H04N 21/454 725/38 |
| 2004/0148625 A1 | 7/2004 | Eldering et al. | |
| 2006/0212900 A1 | 9/2006 | Ismail et al. | |
| 2008/0077951 A1* | 3/2008 | Maggio | H04N 21/25891 348/E7.07 |
| 2008/0310408 A1 | 12/2008 | Thompson et al. | |
| 2010/0050227 A1 | 2/2010 | Acharya et al. | |
| 2010/0191689 A1* | 7/2010 | Cortes | G06F 16/735 725/35 |
| 2012/0110027 A1* | 5/2012 | Falcon | H04N 21/25866 707/802 |
| 2012/0151513 A1* | 6/2012 | Zigmond | H04H 60/64 725/14 |
| 2012/0260278 A1* | 10/2012 | Lambert | H04H 60/66 725/9 |
| 2013/0254787 A1 | 9/2013 | Cox et al. | |
| 2015/0229979 A1 | 8/2015 | Wood et al. | |
| 2016/0094883 A1 | 3/2016 | Tidwell et al. | |
| 2016/0269766 A1 | 9/2016 | Levande et al. | |
| 2016/0337426 A1 | 11/2016 | Shribman et al. | |
| 2017/0006342 A1 | 1/2017 | Nagaraja Rao et al. | |
| 2017/0064358 A1 | 3/2017 | Sullivan et al. | |
| 2018/0176622 A1 | 6/2018 | Sheppard et al. | |
| 2018/0205980 A1 | 7/2018 | Sullivan et al. | |
| 2019/0116392 A1 | 4/2019 | Vinson et al. | |
| 2020/0226465 A1 | 7/2020 | Harrington et al. | |
| 2021/0158391 A1 | 5/2021 | Sheppard et al. | |
| 2021/0195267 A1 | 6/2021 | Sheppard et al. | |
| 2021/0377611 A1 | 12/2021 | Bress et al. | |
| 2023/0079293 A1* | 3/2023 | Das | G06Q 30/02 725/34 |
| 2023/0291948 A1 | 9/2023 | Sullivan et al. | |
| 2023/0342129 A1 | 10/2023 | Sanghavi et al. | |
| 2024/0223833 A1* | 7/2024 | Devir | H04N 21/25866 |

* cited by examiner

DEMOGRAPHIC CLASSIFICATION OF MEDIA ACCOUNTS BASED ON MEDIA CONTENT DATA

CROSS REFERENCE TO RELATED APPLICATIONS

This application is a continuation of U.S. patent application Ser. No. 18/229,046, filed Aug. 1, 2023, now allowed, which is a continuation of U.S. patent application Ser. No. 17/476,026, filed Sep. 15, 2021, now U.S. Pat. No. 11,765,416, which is hereby incorporated by reference in its entirety.

BACKGROUND

Field

This disclosure is generally directed to classification of media accounts of a media system based on inferred demographic information, and more particularly to classification of media accounts of a media system into different demographic buckets based on media content data associated with the media accounts.

Background

One of the biggest trends shaping advertising is the rapid rise of streaming video viewership. With an estimated 150 million US adults now accessing streaming video from various streaming services, advertising through media devices or systems for streaming video can potentially reach a large number of audiences directly within their living rooms. Placement of advertisements with respect to media content viewed by the customers can be a challenge.

SUMMARY

Provided herein are system, apparatus, article of manufacture, method and/or computer program product embodiments, and/or combinations and sub-combinations thereof, for classifying media accounts of a media system into different demographic buckets based on media content data associated with the media accounts, where media content associated with a media account can be accessed by a plurality of members in a household of the media account. Accordingly, to improve the effectiveness, advertisements can be placed to households of media accounts classified in closely related demographic buckets instead of being placed to all customers, which can be more expensive.

An example embodiment of a media system can include a demographic probability score generation unit. The demographic probability score generation unit can receive media account information of a media account managed by the media system. The media account can be established by a primary account holder and accessible by a plurality of members in a household associated with the primary account holder to receive media content from the media system. The demographic probability score generation unit can generate a probability score for the media account with respect to a demographic bucket, which can be an age-gender bucket or some other demographic bucket. In some embodiments, the probability score can be generated based on features of media content data of the media content accessed by the plurality of members in the household, and the media account information. The probability score represents a likelihood that the household includes at least a member belongs to the demographic bucket.

An example embodiment of a media system can include a demographic classifier. The demographic classifier can receive a plurality of media accounts, a plurality of sets of probability scores corresponding to the plurality of media accounts, and a plurality of demographic buckets. A media account can have an associated set of probability scores, where a probability score of the associated set of probability scores represents a likelihood a household of the media account includes at least a member in a corresponding demographic bucket. The demographic classifier can further estimate, based on public available information, an approximate number of media accounts of the plurality of media accounts belonging to a specific demographic bucket. The demographic classifier can further select the approximate number of media accounts to be included in a set of media accounts assigned to the specific demographic bucket. A selected media account is included in the set of media accounts assigned to the specific demographic bucket based on a comparison of a specific probability score for the specific demographic bucket of the associated set of probability scores of the selected media account.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
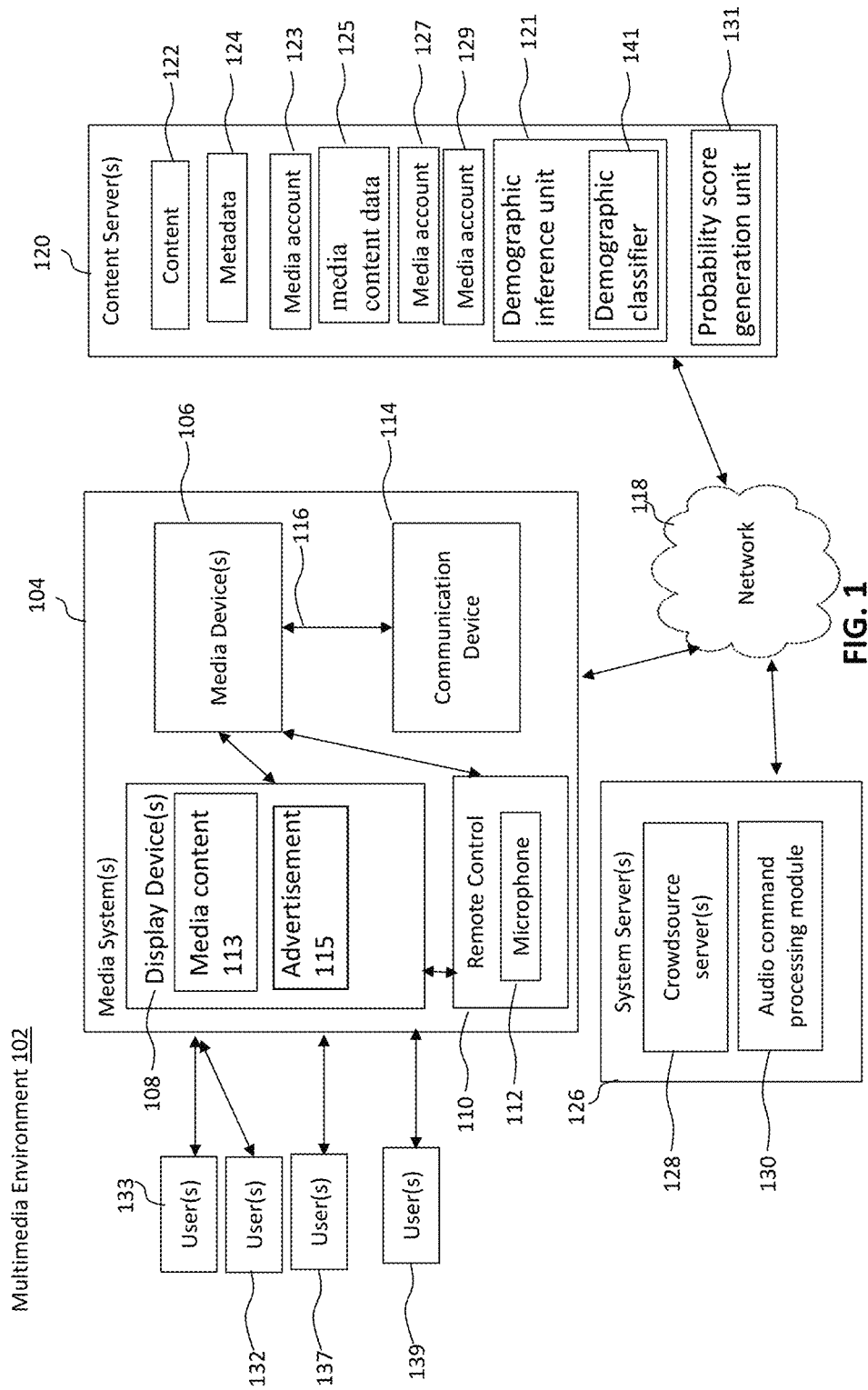
FIG. 1 illustrates a block diagram of a multimedia environment including a demographic probability score generation unit and a demographic classifier, according to some embodiments.

Advertising is a marketing communication that employs an openly sponsored, non-personal message to promote or sell a product, service or idea. Advertisements can be placed in various media, e.g., displayed on a television. One trend shaping advertising is the rapid rise of streaming video viewership. Advertising through streaming media devices or systems can potentially reach a large number of audiences.

Advertisements for products and services may be closely related to the demographic information of the viewers. Customers in different demographic group, such as different ages, gender, education levels, and other demographic parameters, may have different preferences for the products and services they may be interested in. Accordingly, it is useful to identify a customer's demographic information so that advertisements can be placed targeting audiences with matching demographic information, e.g., to place customers into a demographic bucket of age 20-29 or age 30-39.

In some embodiments, a media account can be denoted as M(j), where j is an index in the range of 1 to m, which means it is one of a group of media accounts. Media account M(j) is managed by a media system and can be associated with a household that may include multiple members, such as family members or people living on the same premise. The media account M(j) can be accessible by the multiple members in the household to receive media content from the media system. Demographic information can be inferred based on the features of media content data accessed by the multiple members of the household. Features of media content data may include what kinds of programs have been ordered or watched by the household, at what time, and other information.

In some embodiments, a demographic probability score generation unit can generate a probability score P(j)(i) for the media account M(j) with respect to a demographic bucket denoted as B(i), where both i and j are indices, 1<=i<=n, 1<=j<=m. P(j)(i) represents a likelihood that the household of media account M(j) contains at least a member belongs to the demographic bucket B(i). The probability score P(j)(i) can be generated based on media account information, and features of media content data of the media content accessed by the multiple members in the household.

In some embodiments, for n demographic buckets {B(1), B(2), . . . , B(i), . . . , B(n)}, a media account M(j) can have a set of probability scores P(j)={P(j)(1), P(j)(2), . . . , P(j)(n)} corresponding to the demographic buckets {B(1), B(2), . . . , B(i) . . . , B(n)}. A probability score P(j)(i) represents a likelihood that the household associated with media account M(j) includes at least a member belongs to the corresponding demographic bucket B(i).

In some embodiments, for m media accounts {M(1), . . . M(j), . . . M(m)}, there can be corresponding set of probability scores {P(1), . . . P(j), . . . P(m)} with respect to the n demographic buckets {B(1), B(2), . . . , B(i), . . . , B(n)}. Each media account M(j) can have an associated set of probability scores P(j)={P(j)(1), P(j)(2), . . . , P(j)(n)} corresponding to the demographic buckets {B(1), B(2), . . . , B(i) . . . , B(n)}.

A demographic classifier can classify the m media accounts {M(1), . . . M(j), . . . M(m)} into different sets S(i) of media accounts assigned to different demographic bucket B(i). Accordingly, there may be n such sets of media accounts {S(1), . . . , S(i), . . . S(n)} assigned to the demographic buckets {B(1), . . . , B(i) . . . , B(n)}. For example, media accounts {M(1), M(2)} can be in a set S(1) assigned to demographic bucket B(1), while media accounts {M(3), M(4), M(5)} can be in a set S(2) assigned to demographic bucket B(2). If media account M(j) is assigned to set S(i), media account M(j) has an assigned demographic bucket B(i).

In some embodiments, the demographic classifier can estimate, based on public available information, an approximate number of media accounts belonging to a set of media accounts S(i) assigned to a demographic bucket B(i), which may be referred to as a specific demographic bucket. The approximate number of media accounts belonging to a set of media accounts S(i) provides an estimated upper bound for the set of media accounts S(i) assigned to a demographic bucket B(i).

The demographic classifier can further select the approximate number of media accounts to be included in the set of media accounts S(i). A media account M(j) is selected to be included in the set of media accounts S(i) based on the probability score P(j)(i) for the specific demographic bucket B(i) of the associated set of probability scores P(j)={P(j)(1), P(j)(2), . . . , P(j)(n)} of the media account M(j). For example, M(j) is included in the set of media accounts S(i) when P(j)(i) is ranked among the top approximate number of probability scores P(k)(i) for the specific demographic bucket B(i) in the plurality of media accounts {M(1), . . . M(j), . . . M(m)}. More particularly, the demographic classifier can select a media account M(j1) to be included in the set of media accounts S(i) when P(j1)(i) has the highest probability score among {P(1), . . . P(j), . . . P(m)} with respect to demographic bucket B(i). In addition, the demographic classifier can further select a media account M(j2) with the second highest probability score with respect to demographic bucket B(i), and repeat the selection until the set S(i) has a total approximate number of media accounts.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102 including a demographic probability score generation unit and a demographic classifier, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play media content, e.g., media content 113 or advertisement 115. Various users, such as user 132, user 133, user 137, user 139, may operate with media system 104 to select and consume content.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content 113 and advertisement 115 to display device 108.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, or display device 108 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for media content 113 or advertisement 115 displayed on display device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

In some embodiments, content server 120 may manage a plurality of media accounts, e.g., media account 123, media account 127, and media account 129. A media account may be accessible by one or more members of a household. In some embodiments, media account 123 may be accessible by user 132 and user 133, media account 127 may be accessible by user 137, and media account 129 may be accessible by user 139. For media account 123, user 132 and user 133 may access media content 113 or advertisement 115 to be displayed on display device 108. Content server 120 may collect and store media content data 125, which may be some raw data about media content 113 or advertisement 115, such as the name of a show being viewed, a time the show being viewed, and other related information. Content server 120 may further include a probability score generation unit 131 to generate a probability score for the media account associated with a demographic bucket. Content server 120 may further include a demographic inference unit 121 to infer demographic information of media accounts, such as media account 123, media account 127, and media account 129. Demographic inference unit 121 may include a demographic classifier 141 to classify media accounts, such as media account 123, media account 127, and media account 129, into a set of media accounts assigned to a specific demographic bucket. More details of operations of demographic classifier 141, demographic inference unit 121, and probability score generation unit 131 are illustrated and described in FIG. 3.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132, 133, 137, and 139, watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
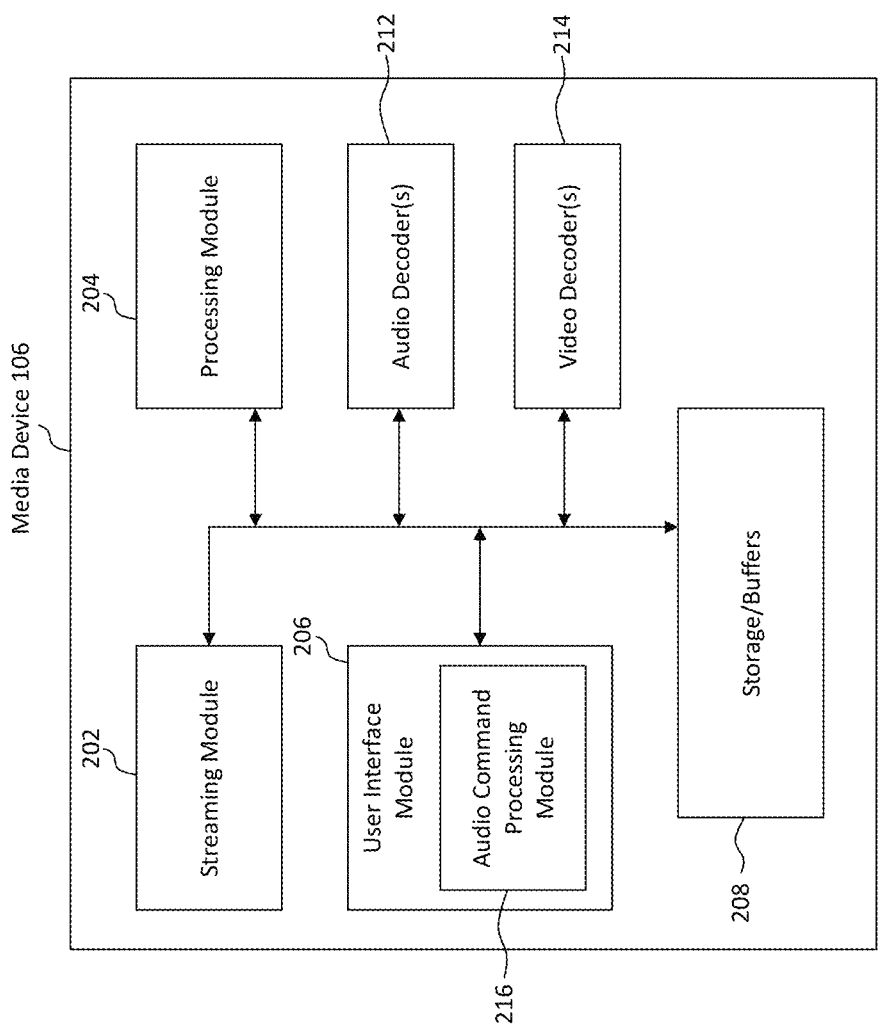
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Coordination Between a Source Media Device, a Host Device, and a Speaker Device.

Figure 3:
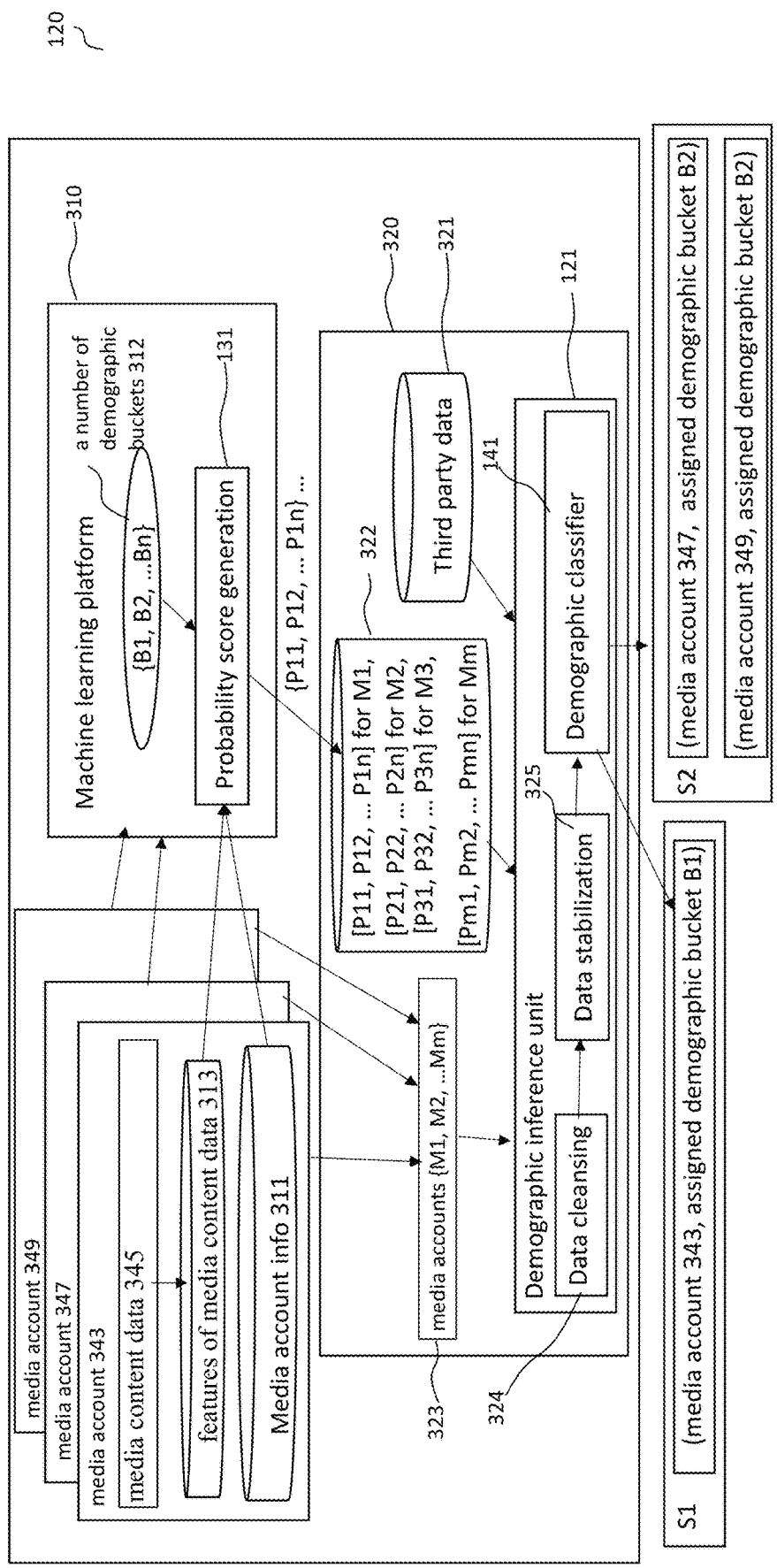
FIG. 3 illustrates an example system server for classifying media accounts of a media system into different demographic buckets based on media content data associated with the media accounts, according to some embodiments.

FIG. 3 illustrates an example system server 120 for classifying media accounts of a media system into different demographic buckets based on media content data associated with the media accounts, according to some embodiments. Server 120 includes probability score generation unit 131, demographic classifier 141 included in demographic inference unit 121. In some embodiments, functions described herein can be implemented in an independent computing device instead of being implemented on server 120.

In some embodiments, server 120 may manage multiple media accounts, such as media account 343, media account 347, media account 349, which are a part of m media accounts {M1, M2, . . . , Mm}. Media account 343 is described in details below, which can be applicable to other media accounts such as media account 347, media account 349, or any other media account Mj.

In some embodiments, media account 343 is accessible by a plurality of members in a household associated with media account 343 to receive media content from the media system. Media account 343 can be established by a primary account holder and accessible by a plurality of members in a household associated with the primary account holder to receive media content from the media system. Media account 343 can include media content data 345, which are data related to media content 113 displayed on display device 108 accessed by the multiple members of the household associated with media account 343. Media content data 345 can be collected when media content 113 is displayed, and can be collected for various purposes such as billing purpose. Based on media content data 345, features of media content data 313 may be derived based on various statistical methods. Features of media content data 313 may be statistical properties of media content data 345. Features of media content data 313 may be based on the media content accessed by the plurality of members in the household. In some embodiments, features of media content data 313 may include aggregated viewing hours across a plurality of days, viewing behavior across a plurality of media content genres, viewing propensity across a plurality of ad-supported channels, channel installation activities, and viewing affinity across a plurality of time ranges of a day including a prime time and an early morning. Other features of media content data may be included as well.

In some embodiments, media account 343 can also include media account information 311, which may include subscription information of media account 343, such as the name of the media account holder, the address, the programs subscription, or any other information that may be collected for account management purpose. Some of media account information 311 can be data collected from the primary account holder during the registration process for the primary account holder. Other information may be added, changed, or updated later by members of the household associated with the primary account holder.

In some embodiments, probability score generation unit 131 can receive media account information 311 and features of media content data 313, and generate a probability score P11 of media account 343 with respect to a demographic bucket B1. Probability score P11 may be generated based on features of media content data 313 and media account information 311. Probability score generation unit 131 may be included in a machine learning platform 310 to generate probability score P11 by applying some machine learning algorithms, such as supervised machine learning or unsupervised machine learning.

In some embodiments, probability score P11 may represent a likelihood that the household of media account 343 includes at least a member belongs to the demographic bucket B1. Demographic bucket B1 may include an age-gender bucket. In some embodiments, the age-gender bucket of demographic bucket B1 may be related to a male gender or a female gender, and related to an age range including multiple years of ages. For example, demographic bucket B1 can be a bucket of (male, age 18-20), which represents the viewers of males within the age range of 18 years old to 20 years old. Similarly, other demographic bucket B2, B3 can be a bucket of (male, age 21-24), (male, age 25-29), or some other demographic bucket.

In some embodiments, the various demographic buckets {B1, B2, . . . Bn} can be inputs 312 to probability score generation unit 131. For media account 343, probability score generation unit 131 can generate a set of probability scores P1={P11, P12, . . . P1n}, where a probability score P1i represents a likelihood the household of media account 343 includes at least a member in a corresponding demographic bucket Bi. In some embodiments, for the set of a plurality of demographic buckets {B1, B2, . . . Bn}, the sum of the set of probability scores {P11, P12, . . . P1n} is equal to 1, e.g., P11+P12+ . . . +P1n=1, which means media account 343 must belong to one of the demographic buckets {B1, B2, . . . Bn}. Each probability score of the set of probability scores {P11, P12, . . . , P1n} can be generated based on media account information 311 and features of media content data 313, similar to the way P11 is generated.

In some embodiments, for media account 347, a set of probability scores P2={P21, P22, . . . P2n} with respect to the set of a plurality of demographic buckets {B1, B2, . . . Bn} can be generated in a way similar to the way {P11, P12, . . . , P1n} is generated for media account 343. In addition, for media account 349, a set of probability scores P3={P31, P32, . . . P3n} with respect to the set of a plurality of demographic buckets {B1, B2, . . . Bn} can be generated in a way similar to the way {P11, P12, . . . , P1n} is generated for media account 343. Media account 343, media account 347, and media account 349 are examples of a set of a plurality of media accounts {M1, . . . Mm}. For each media account Mj of the set of a plurality of media accounts {M1, . . . Mm}, a corresponding set of probability scores Pj={Pj1, Pj2, . . . Pjn} with respect to the set of a plurality of demographic buckets {B1, B2, . . . Bn} can be generated.

In some embodiments, a plurality of media accounts {M1, . . . Mm}, a plurality of demographic buckets {B1, B2, . . . Bn}, a plurality of sets of probability scores corresponding to the plurality of media accounts, {P11, P12, . . . , P1n}, {P21, P22, . . . P2n}, . . . , {Pj1, Pj2, . . . Pjn}, . . . , {Pm1, Pm2, . . . Pmn} are provided as inputs to demographic inference unit 121 to determine an assigned demographic bucket for each of the media account Mj. Demographic inference unit 121 includes demographic classifier 141 to classify media accounts, such as media account 343, media account 347, and media account 349, which are a part of {M1, . . . Mm}, into n sets of media accounts {S1, S2, . . . Sn} assigned to a specific demographic bucket {B1, B2, . . . Bn}. For example, demographic classifier 141 may classify media account 343 into a set S1 that is assigned to demographic bucket B1, and classify media account 347 and media account 349 into a set S2 that is assigned to demographic bucket B2. In doing so, demographic classifier 141 determines an assigned demographic bucket for a media account. For example, demographic classifier 141 determines an assigned demographic bucket B1 for media account 343, determines an assigned demographic bucket B2 for media account 347 and media account 349.

In some embodiments, demographic classifier 141 may perform the classification of media accounts {M1, . . . Mm} based on at least one or more selected from the media account information for media accounts, such as media account information 311, third party data 321, which may be public available information. For example, third party data 321 may include government Census data. In some embodiments, media accounts {M1, . . . Mm} may be saved on a storage 323, the plurality of sets of probability scores corresponding to the plurality of media accounts, P1={P11, P12, . . . , P1n}, P2={P21, P22, . . . P2n}, . . . , Pj={Pj1, Pj2, . . . Pjn}, . . . , Pm={Pm1, Pm2, . . . Pmn}, may be saved in a storage 322. In addition, preliminary operations may be performed on the received data, such as {M1, . . . Mm}, {P11, P12, . . . , P1n}, {P21, P22, . . . P2n}, . . . , {Pj1, Pj2, . . . Pjn}, . . . , {Pm1, Pm2, . . . Pmn}. Preliminary operations may include data cleansing operations performed at 324. For example, data cleansing rules can be applied to remove demographic predictions for age below 18. Preliminary operations may also include data stabilization operations performed at 325. For example, data stabilization rules can be applied to avoid reassignments of demographic labels for existing media account households frequently. The data stabilization rule accepts brand new households of media accounts each time and existing accounts once in a quarter.

In some embodiments, for a specific demographic bucket Bi, demographic classifier 141 may estimate, based on the public available information or third party data 321, an approximate number of media accounts of {M1, . . . Mm} belonging to the set of media accounts Si assigned to the specific demographic bucket Bi. In addition, demographic classifier 141 may select a total number of media accounts to be placed into the set of media accounts Si assigned to the specific demographic bucket Bi, where the total number of media accounts is smaller than or equal to the approximate number of media accounts estimated by demographic classifier 141. The selection of a media account may be based on a comparison of a specific probability score for the specific demographic bucket of the associated set of probability scores of the selected media account. For the probability score {P(1i), P(2i), . . . P(mi)} with respect to demographic bucket Bi, demographic classifier 141 may sort media accounts {M1, . . . Mm} based on the probability score {P(1i), P(2i), . . . P(mi)}, and select the approximate number, denoted as k, of media accounts to be placed into the set Si. A media account Mj is selected to be placed into the set Si when P(ji) is ranked among the top k in the set of {P(1i), P(2i), . . . P(mi)}. Accordingly, for a media account Mj1 placed in the set Si, and a media account Mj2 not placed in the set Si, the probability score P(j1)i is larger than the probability score P(j2)i. For example, demographic classifier 141 may select media account 343 to be placed in the set S1 assigned to demographic bucket B1, and select media account 347 to be placed in the set S2 assigned to demographic bucket B2, when P(11)>(P21), and (P12)<P(22).

In some embodiments, demographic classifier 141 may receive a plurality of media accounts {M1, . . . Mm}, a plurality of sets of probability scores {P1, P2, . . . Pm} corresponding to the plurality of media accounts {M1, . . . Mm}, and a plurality of demographic buckets {B1, B2, . . . Bn}. A media account Mj has an associated set of probability scores Pj={Pj1, Pj2, . . . Pjn}, a probability score Pji of the associated set of probability scores Pj represents a likelihood a household of the media account Mj includes at least a member in a demographic bucket Bi.

In some embodiments, demographic classifier 141 may estimate, based on public available information, an approximate number of media accounts belonging to a set of media accounts Si assigned to a specific demographic bucket Bi.

Demographic classifier 141 may select the approximate number of media accounts to be included in the set of media accounts Si assigned to the specific demographic bucket Bi. A selected media account Mj is included in the set of media accounts Si assigned to the specific demographic bucket Bi based on a comparison of a specific probability score Pji for the specific demographic bucket Bi. The selected media account Mj has an assigned demographic bucket Bi when Mj is placed into the set Si.

In some embodiments, a media account may be placed into two different sets Si1 and Si2. In some embodiments, a media account may be placed into only one set Si. In some embodiments, two demographic buckets of {B1, B2, ... Bn} may have non-empty overlap. In some other embodiments, two demographic buckets of {B1, B2, ... Bn} may not have any overlap.

In some embodiments, demographic classifier 141 may implement the above described functions in various ways. In some embodiments, demographic classifier 141 may iterate each age-gender demographic bucket and sort the probability scores from highest to lowest. In case of identical scores for a particular demographic label, a sampling methodology may be applied to ensure a fair chance of members being selected to be placed into a set Si. Media accounts that are not selected to be placed into a set Si in the first iteration process for any age-gender assignment can have a second chance to be placed into a set Si. In some embodiments, demographic classifier 141 may stop the selection process when the assignments reach an agreed average threshold based on census data. For every iteration, new media accounts may be added to the selection process. Existing accounts may be refreshed on a period agreed cadence to update to their latest demographic assignments.

Figure 4:
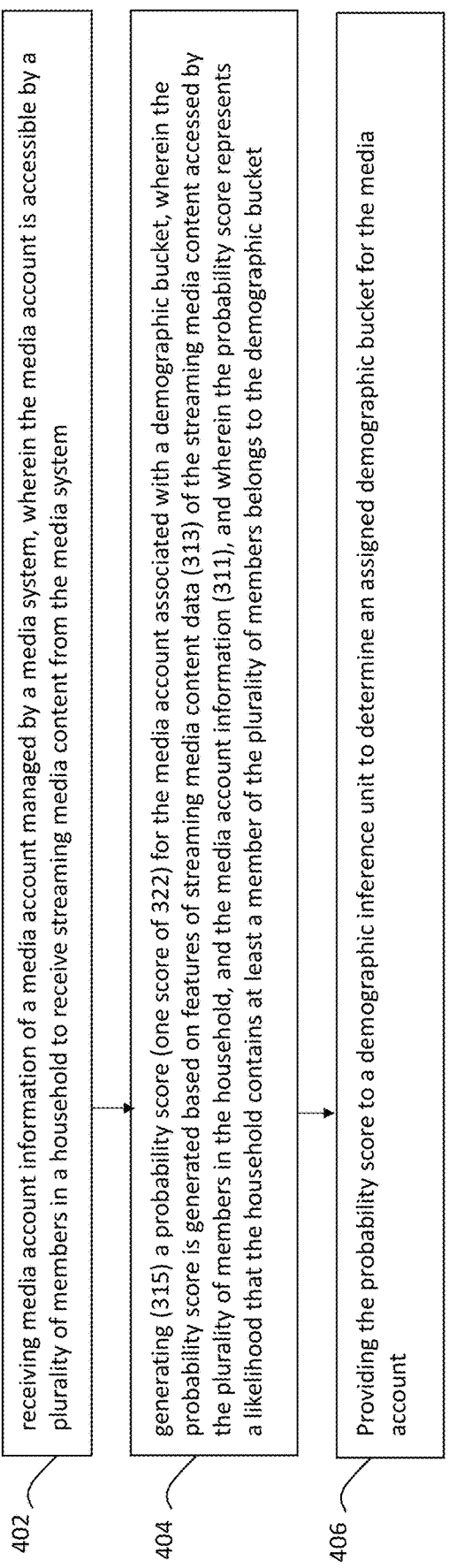
FIG. 4 illustrates an example process performed by a computing device to classify media accounts of a media system into different demographic buckets based on media content data associated with the media accounts, according to some embodiments.

FIG. 4 illustrates an example process 400 performed by a computing device to classify media accounts of a media system into different demographic buckets based on media content data associated with the media accounts, according to some embodiments. Processes 400 can be performed by processing logic that can comprise hardware (e.g., circuitry, dedicated logic, programmable logic, microcode, etc.), software (e.g., instructions executing on a processing device, such as by controller 303), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 402, server 120 may receive media account information of a media account managed by a media system, where the media account is accessible by a plurality of members in a household associated with the media account to receive media content from the media system. For example, as described for FIGS. 1 and 3, server 120 may receive media account information 311 of media account 123 managed by a media system.

At 404, server 120 may generate a probability score of the media account for a demographic bucket, where the probability score is generated based on features of media content data of the media content accessed by the plurality of members in the household, and the media account information. For example, as described for FIGS. 1 and 3, server 120 may generate a probability score P11 of media account 343 for a demographic bucket B1, where the probability score P11 is generated based on features of media content data 313 of media content 113 accessed by the plurality of members in the household, and the media account information 311.

At 406, server 120 may provide the probability score to a demographic inference unit to determine an assigned demographic bucket for the media account. For example, as described for FIGS. 1 and 3, server 120 may provide the probability score P11 to demographic inference unit 121 to determine an assigned demographic bucket for media account 343, which can be determined to be demographic bucket B1.

There can be other operations performed by server 120, which are not shown in process 400. For example, server 120 can receive a plurality of media accounts {M1, ... Mm}, a plurality of sets of probability scores {P1, P2, ... Pm} corresponding to the plurality of media accounts, and a plurality of demographic buckets {B1, B2, ... Bn}; estimate, based on public available information, an approximate number of media accounts belonging to a set of media accounts Si assigned to a specific demographic bucket Bi; and select the approximate number of media accounts to be included in a set of media accounts Si assigned to the specific demographic bucket. A selected media account is included in the set of media accounts assigned to the specific demographic bucket based on a comparison of a specific probability score for the specific demographic bucket of the associated set of probability scores of the selected media account.

Example Computer System

Figure 5:
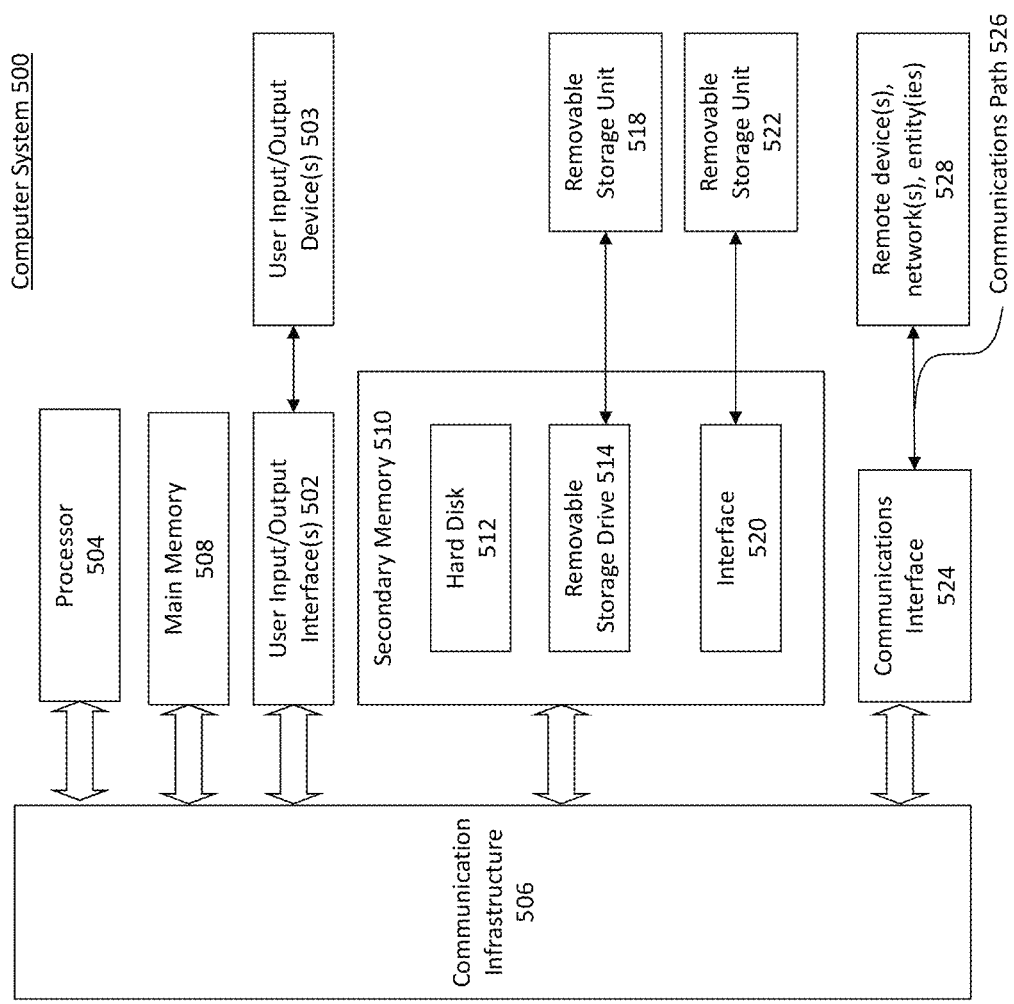
FIG. 5 illustrates an example computer system useful for implementing various embodiments.

Various embodiments may be implemented, for example, using one or more well-known computer systems, such as computer system 500 shown in FIG. 5. For example, media device 106, display device 108, user device 150, third party shopping system 140, content server 120, system server 126, media system 504, media server system 530, third party shopping system 540, may be implemented using combinations or sub-combinations of computer system 500 to perform various functions described herein, e.g., by process 400. Also or alternatively, one or more computer systems 500 may be used, for example, to implement any of the embodiments discussed herein, such as server 120 and operations performed by server 120 as described in FIGS. 3-4, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for classifying media accounts of a media system, comprising:
    receiving, by at least one computer processor, media account information of a media account managed by the media system, wherein the media account is established by a primary account holder and accessible by a plurality of members in a household associated with the primary account holder to receive media content from the media system;
    generating a first probability score of the media account for a first demographic bucket among a number of demographic buckets, wherein the first probability score represents a likelihood that the household contains at least a member of the plurality of members belonging to the first demographic bucket, wherein the media account is associated with a set of probability scores having a number of probability scores including the first probability score corresponding to the number of demographic buckets including the first demographic bucket, and wherein a sum of all probability scores of the set of probability scores associated with the media account is equal to 1; and
    providing the number of probability scores associated with the media account including the first probability score to determine an assigned demographic bucket for the media account, wherein the media account is classified into a set of media accounts having multiple media accounts, and wherein the multiple media accounts of the set of media accounts are assigned to the assigned demographic bucket selected from the number of demographic buckets based on the number of probability scores.

2. The computer-implemented method of claim 1, wherein the first demographic bucket includes an age-gender bucket.

3. The computer-implemented method of claim 1, wherein the media account information includes information received from the primary account holder.

4. The computer-implemented method of claim 1, wherein the generating the first probability score of the media account for the first demographic bucket comprises:
    generating the first probability score of the media account for the first demographic bucket based on features of the media content, wherein the features include at least one or more features selected from aggregated viewing hours across a plurality of days, viewing behavior across a plurality of media content genres, viewing propensity across a plurality of ad-supported channels, channel installation activities, and viewing affinity across a plurality of time ranges of a day including a prime time and an early morning.

5. The computer-implemented method of claim 1, wherein the media account is a first media account of a plurality of media accounts, and the computer-implemented method further comprises:
    generating a second probability score of a second media account of the plurality of media accounts for a second demographic bucket among the number of demographic buckets, wherein the second probability score represents a likelihood that a member associated with the second media account belongs to the second demographic bucket; and
    assigning the first media account to the one or more demographic buckets when the first probability score of the first media account corresponding to the number of demographic buckets is higher than the second probability score of the second media account corresponding to the number of demographic buckets.

6. The computer-implemented method of claim 5, further comprising:
    estimating, based on publicly available information, an approximate number of media accounts of the plurality of media accounts belonging to the number of demographic buckets.

7. The computer-implemented method of claim 6, further comprising:
    assigning the first media account to the number of demographic buckets when a total number of media accounts being assigned to the number of demographic buckets is smaller than or equal to the approximate number of media accounts of the plurality of media accounts being assigned to the number of demographic buckets.

8. A system, comprising:
    one or more memories; and
    at least one processor each coupled to at least one of the memories and configured to perform operations comprising:
    receiving media account information of a media account managed by a media system, wherein the media account is established by a primary account holder and accessible by a plurality of members in a household associated with the primary account holder to receive media content from the media system;
    generating a first probability score of the media account for a first demographic bucket among a number of demographic buckets, wherein the first probability score represents a likelihood that the household contains at least a member of the plurality of members belonging to the first demographic bucket, wherein the media account is associated with a set of probability scores having a number of probability scores including the first probability score corresponding to the number of demographic buckets including the first demographic bucket, and wherein a sum of all probability scores of the set of probability scores associated with the media account is equal to 1; and
    providing the number of probability scores associated with the media account including the first probability score to determine an assigned demographic bucket for the media account, wherein the media account is classified into a set of media accounts having multiple media accounts, and wherein the multiple media accounts of the set of media accounts are assigned to the assigned demographic bucket selected from the number of demographic buckets based on the number of probability scores.

9. The system of claim 8, wherein the first demographic bucket includes an age-gender bucket.

10. The system of claim 8, wherein the media account information includes information received from the primary account holder.

11. The system of claim 8, wherein the generating the first probability score of the media account for the first demographic bucket comprises:
generating the first probability score of the media account for the first demographic bucket based on features of the media content, wherein the features include at least one or more features selected from aggregated viewing hours across a plurality of days, viewing behavior across a plurality of media content genres, viewing propensity across a plurality of ad-supported channels, channel installation activities, and viewing affinity across a plurality of time ranges of a day including a prime time and an early morning.

12. The system of claim 8, wherein the media account is a first media account of a plurality of media accounts, and the operations further comprise:
generating a second probability score of a second media account of the plurality of media accounts for a second demographic bucket among the number of demographic buckets, wherein the second probability score represents a likelihood that a member associated with the second media account belongs to the second demographic bucket; and
assigning the first media account to the one or more demographic buckets when the first probability score of the first media account corresponding to the number of demographic buckets is higher than the second probability score of the second media account corresponding to the number of demographic buckets.

13. The system of claim 12, the operations further comprising:
estimating, based on publicly available information, an approximate number of media accounts of the plurality of media accounts belonging to the number of demographic buckets.

14. The system of claim 13, the operations further comprising:
assigning the first media account to the number of demographic buckets when a total number of media accounts being assigned to the number of demographic buckets is smaller than or equal to the approximate number of media accounts of the plurality of media accounts being assigned to the number of demographic buckets.

15. A non-transitory computer-readable medium having instructions stored thereon that, when executed by at least a computing device, cause the computing device to perform operations comprising:
receiving media account information of a media account managed by a media system, wherein the media account is established by a primary account holder and accessible by a plurality of members in a household associated with the primary account holder to receive media content from the media system;
generating a first probability score of the media account for a first demographic bucket among a number of demographic buckets, wherein the first probability score represents a likelihood that the household contains at least a member of the plurality of members belonging to the first demographic bucket, wherein the media account is associated with a set of probability scores having a number of probability scores including the first probability score corresponding to the number of demographic buckets including the first demographic bucket, and wherein a sum of all probability scores of the set of probability scores associated with the media account is equal to 1; and
providing the number of probability scores associated with the media account including the first probability score to determine an assigned demographic bucket for the media account, wherein the media account is classified into a set of media accounts having multiple media accounts, and wherein the multiple media accounts of the set of media accounts are assigned to the assigned demographic bucket selected from the number of demographic buckets based on the number of probability scores.

16. The non-transitory computer-readable medium of claim 15, wherein the first demographic bucket includes an age-gender bucket.

17. The non-transitory computer-readable medium of claim 15, wherein the generating the first probability score of the media account for the first demographic bucket comprises:
generating the first probability score of the media account for the first demographic bucket based on features of the media content, wherein the features include at least one or more features selected from aggregated viewing hours across a plurality of days, viewing behavior across a plurality of media content genres, viewing propensity across a plurality of ad-supported channels, channel installation activities, and viewing affinity across a plurality of time ranges of a day including a prime time and an early morning.

18. The non-transitory computer-readable medium of claim 15, wherein the media account is a first media account of a plurality of media accounts, and the operations further comprise:
generating a second probability score of a second media account of the plurality of media accounts for a second demographic bucket among the number of demographic buckets, wherein the second probability score represents a likelihood that a member associated with the second media account belongs to the second demographic bucket; and
assigning the first media account to the one or more demographic buckets when the first probability score of the first media account corresponding to the number of demographic buckets is higher than the second probability score of the second media account corresponding to the number of demographic buckets.

19. The non-transitory computer-readable medium of claim 18, the operations further comprising:
estimating, based on publicly available information, an approximate number of media accounts of the plurality of media accounts belonging to the number of demographic buckets.

20. The non-transitory computer-readable medium of claim 19, the operations further comprising:
assigning the first media account to the number of demographic buckets when a total number of media accounts being assigned to the number of demographic buckets is smaller than or equal to the approximate number of media accounts of the plurality of media accounts being assigned to the number of demographic buckets.

\* \* \* \* \*